SCALE FACTOR DEVICE FOR NORMALIZING A BINARY NUMBER

Filed Dec. 31, 1963

4 Sheets-Sheet 1

INVENTOR

GLEN R. KREGNESS

BY Griffin and Stokes

ATTORNEYS

Feb. 8, 1966 G. R. KREGNESS 3,234,368

SCALE FACTOR DEVICE FOR NORMALIZING A BINARY NUMBER

Filed Dec. 31, 1963 4 Sheets-Sheet 3

United States Patent Office 3,234,368

Patented Feb. 8, 1966

3,234,368

SCALE FACTOR DEVICE FOR NORMALIZING A BINARY NUMBER

Glen R. Kregness, Hopkins, Minn., assignor to Sperry Rand Corporation, New York, N.Y., a corporation of Delaware

Filed Dec. 31, 1963, Ser. No. 334,877
20 Claims. (Cl. 235—159)

This invention relates to electronic digital computing devices and more particularly to normalizer or scale factor circuits for digital computers.

In some computer applications particularly those relating to the solution of scientific problems it is necessary to deal with numbers which extend over a very large range of values. On the other hand, in the design of binary computers it is necessary to take into consideration the cost of the computer and the speed of the arithmetic circuits it contains. Therefore, most binary computers operating in the parallel mode are designed with a word length capable of representing numbers over a somewhat limited range of values and other means are employed to represent values extending outside this range.

One method of effectively extending the operating range of a binary computer is a programming technique in which scale factors are employed. In this technique each number is normalized by shifting it to the left until the most significant bit is adjacent the sign position. The left shifts are counted to produce the scale factor and the scale factor is stored in memory at a different location from that in which the normalized word is stored. Each time an arithmetic operation is to be performed on the normalized words the words and their scale factors are withdrawn from memory. By proper manipulation of the scale factors the computer may effectively operate upon numbers larger than those which may be represented by a computer word in conventional format.

Some computers now known employ a shift register and a shift counter for generating scale factors. Each time the register is left shifted one is added to the counter and the highest order of the register is compared with the sign bit. When the two are equal the number is in normalized position and the count in the counter represents the scale factor.

Therefore, an object of this invention is to provide a normalizer circuit for normalizing a binary number in a minimum amount of time, said time being independent of the position of the most significant digit in the number.

An object of this invention is to provide a normalizer circuit and scale factor generator which normalizes a number and produces a scale factor in a period of time independent of the location of the most significant digit in the number.

An object of this invention is to provide means for generating the scale factor of a number and subsequently employing this scale factor to normalize the number.

An object of this invention is to provide means for generating the scale factor of a number from a half-add result obtained by half-adding said number to a second number. The second number may have a value equal to one-half the value of the number being scaled. Alternatively, the second number may have a value of zero.

The programming technique mentioned above is relatively inefficient. It requires a considerable amount of programming, utilizes additional storage locations for storing the scale factors, and requires that arithmetic operations be performed on the scale factors as well as the normalized numbers. Therefore, some computers of the prior art are provided with a floating point capability. In these computers the scale factor is located in the same computer word as the number with which it is associated.

This considerably reduces the amount of programming and storage required.

Therefore, a further object of this invention is to provide means for converting a computer word in conventional format into a word in floating point format.

An object of this invention is to provide means for half-adding a number to one-half its value to produce a pattern of sum bits, means responsive to said sum bits for producing a pattern of group signals, means responsive to said group signals and said sum bits for producing a right shift count and a left shift count, means responsive to said right shift count for right circular shifting said number, and means for selecting either the right shift count or the left shift count as the characteristic of said number.

Other objects of the invention and its mode of operation will become apparent upon consideration of the following description and the accompanying drawing in which.

Figure 5B:
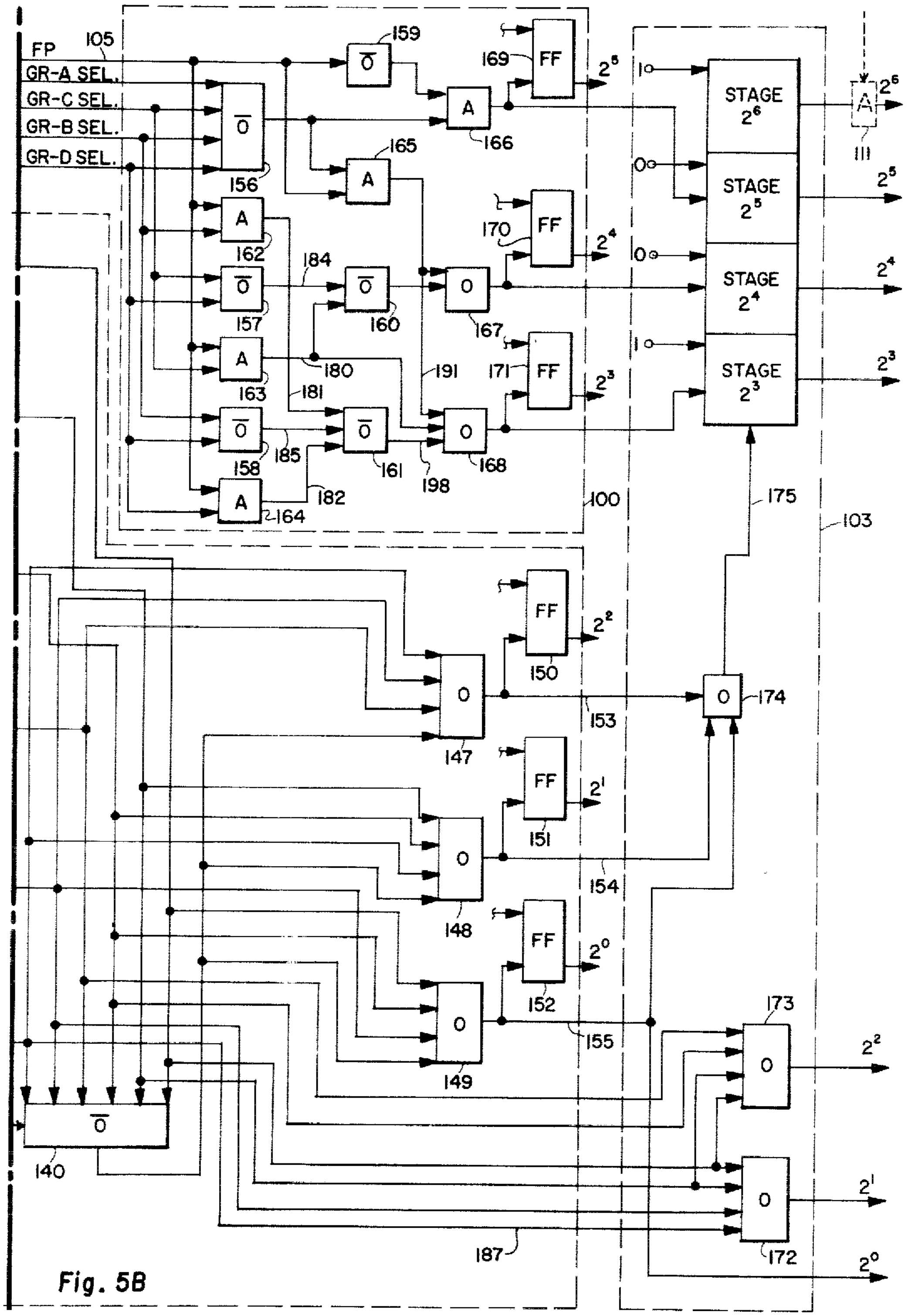
Figures 5A, 5C:
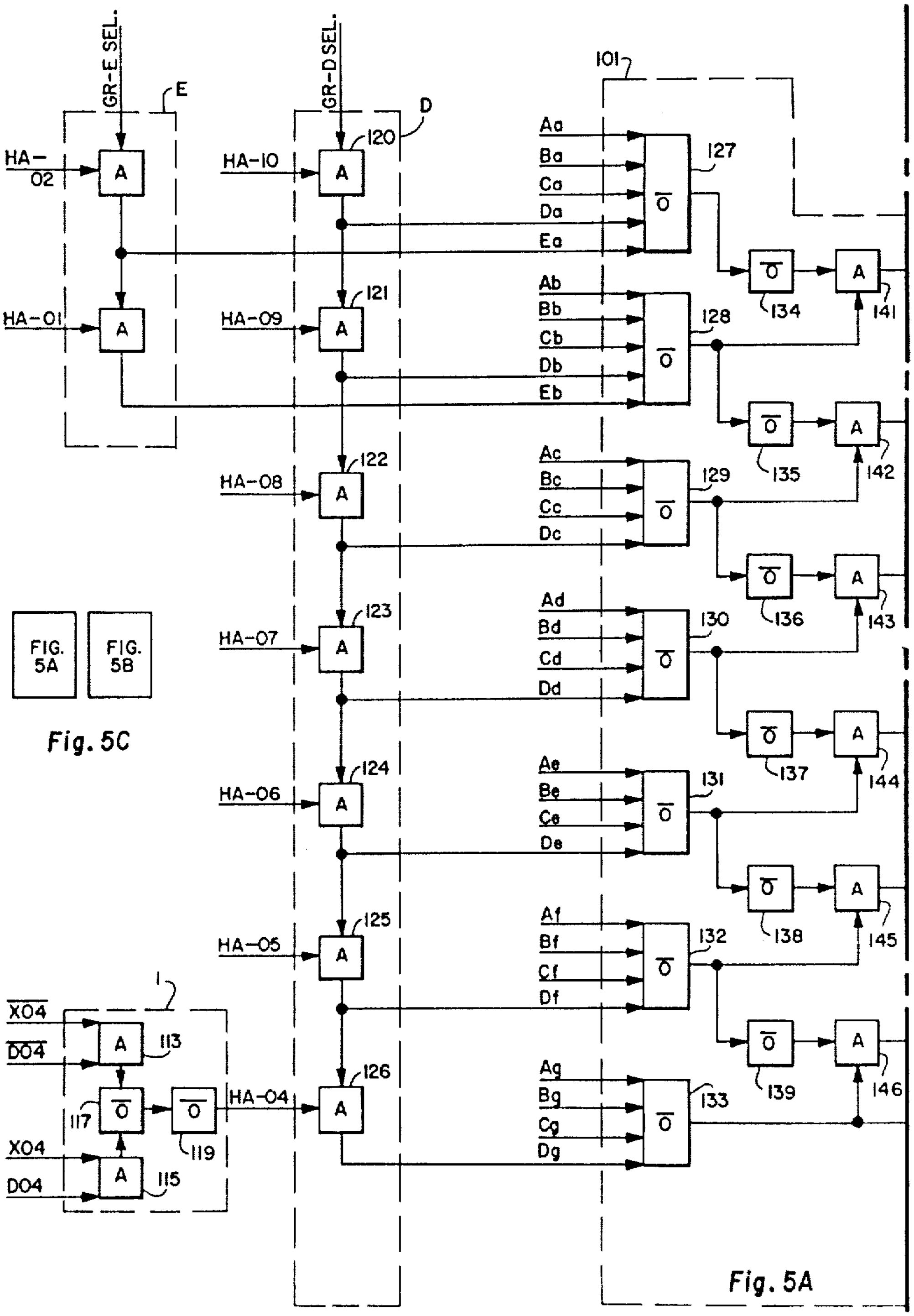

FIGURES 5A and 5B when arranged as shown in FIGURE 5C illustrate the logic of the bit selectors, group and bit translators, and the subtractor.

Example 1 illustrates an unnormalized computer word arranged in conventional or non-floating point format.

The computer word has thirty-six binary orders or bit positions. There is a sign position designated S and thirty-five positions of numerical significance designated thirty-four through zero in decreasing order of numerical significance.

| | | | | | | |
|---|---|---|---|---|---|---|
| S | 34 | 33 | 32 | 31 | ............... | 10 |
| 0 | 0 | 0 | 1 | 1 | ............... | 00 |

EXAMPLE I

A positive number is designated by a binary 0 in the sign position and a negative number is designated by a binary 1 in the sign position. Negative numbers are expressed in the 1's complement notation hence binary 1's represent significant bits in a positive number and binary 0's represent significant bits in a negative number. The decimal (binal) point is considered to be located between the sign bit and bit position 34. In Example I the binary 1 in bit position 32 represents the decimal fraction $1/8$ and the binary 1 in bit position 31 represents the decimal fraction $1/16$. Therefore, the binary number shown in Example I has an equivalent decimal value of $+3/16$.

A number is normalized by shifting it to the left until the most significant digit is adjacent the decimal point. Obviously, shifting the number changes its binary significance so the normalized number must have associated with it a scale factor. This scale factor has the value $2^{-n}$ where $n$ is the number of left shifts required to place the most significant bit adjacent the decimal point.

Example II shows the value $+3/16$ after it has been normalized. Considering only the word shown in Example II, it has the value $1/2+1/4=3/4$. Associated with this number and stored as a separate word is a scale factor

| | | | | | | | | |
|---|---|---|---|---|---|---|---|---|
| S | 34 | 33 | 32 | | 3 | 2 | 1 | 0 |
| 0 | 1 | 1 | | ............... | 0 | 0 | 0 | 0 |

EXAMPLE II $2^{-2}$ since it took two left shifts to normalize the number. Thus, the true value of Example II is $\frac{3}{4}\times 2^{-2}$ or $\frac{3}{4}\times\frac{1}{4}=\frac{3}{16}$. In one mode of operation the apparatus hereinafter described converts a word from the form shown in Example I to the form shown in Example II and produces a binary representation of its scale factor.

The present apparatus is admirably suited for use in computers having means for handling numbers in floating point format. Example III shows a typical computer word in floating point format. The word contains a sign bit, an eight bit scale factor or characteristic, and a twenty-seven bit mantissa. When operating in a floating

| Characteristic | Mantissa |
|---|---|
| S 34 27<br>1 0 0 0 0 0 0 0 1 | 26 25 0<br>0 1 ---------- 1 |

EXAMPLE III point mode the decimal point is considered to be located between bit positions 26 and 27. Both the characteristic and the mantissa are expressed in the 1's complement notation. Thus, the negative characteristic for a negative number is the 1's complement of the negative characteristic for a positive number. Negative characteristics indicate the number has been left shifted to put it in normalized form. In like manner, a positive characteristic for a negative number is the 1's complement of a positive characteristic for a positive number. A positive characteristic indicates that the number was right shifted in order to place it in normalized form.

Example III shows the value $-\frac{1}{4}$ expressed in floating point format. The binary 0 in bit position 26 of the mantissa has as a value $\frac{1}{2}$ and since the sign bit is a one the mantissa is negative and equal to $-\frac{1}{2}$. The characteristic has a value of 1 but since the sign is a negative this value must be complemented to obtain the value $-1$. Thus, the characteristic has a value of $2^{-1}$ or $\frac{1}{2}$. Multiplying the mantissa by the characteristic gives a value $-\frac{1}{4}$.

Example IV shows the value $+\frac{1}{4}$ expressed in floating point format. Note that in Examples III and IV the characteristic has the same value but is expressed differently because the sign of the mantissa is different in the two cases.

| Characteristic | Mantissa |
|---|---|
| S 34 27<br>0 1 1 1 1 1 1 1 0 | 26 25 0<br>1 0 ---------- 0 |

EXAMPLE IV

Figures 1, 4:
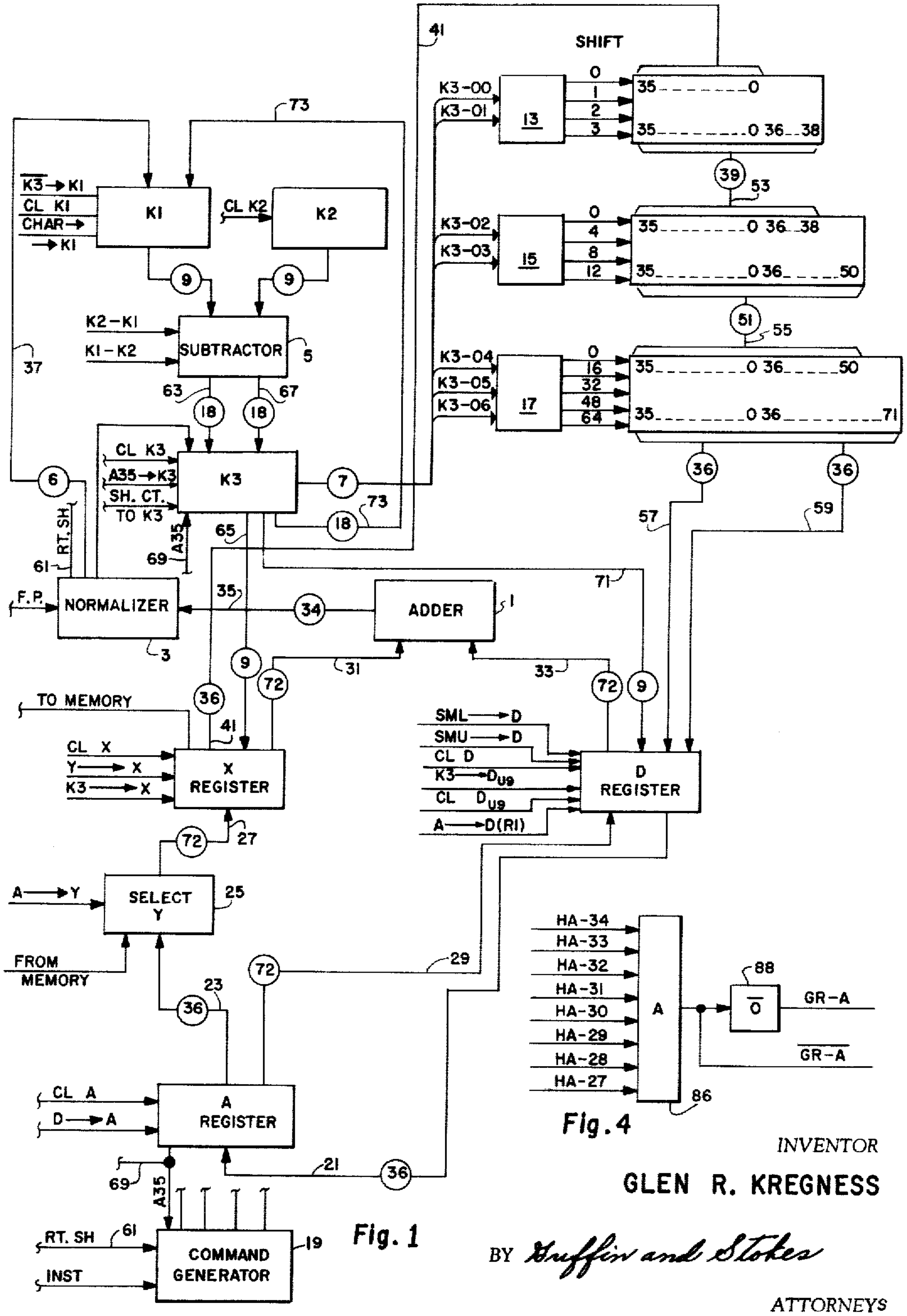
FIGURE 1 is a block diagram of a system capable of either normalizing and generating the scale factor of a binary number or converting an unnormalized binary number in conventional format to a normalized number in floating point format.
FIGURE 4 illustrates a group selector.

Referring now to FIGURE 1, the present invention includes a plurality of binary storage registers A, X, D, K1, K2, and K3, a gating matrix designated Select Y, an adder 1, a normalizer 3, a subtractor 5, a shift matrix having three levels of gating designated 7, 9, and 11, decoding means 13, 15 ,and 17, and a command generator 19. With the exception of the normalizer and the shift matrix all elements shown in FIGURE 1 are of conventional design and a detailed description is unnecessary for an understanding of the present invention.

Command generator 19 includes conventional means for storing and decoding instructions and producing the commands for executing the instructions. As subsequently described, the command generator produces one sequence of commands in response to the instruction Normalize Floating Point and another sequence of commands in response to the instruction Normalize Non-Floating Point.

The A register is a thirty-six bit storage register and includes a set of gates responsive to the command D to A. The output of the D register is continuously applied to these gates over a transfer bus 21 and upon occurrence of the command D to A the contents of the D register are entered into the A register. The information from the D register is single gated into the A register hence it is necessary to clear the A register before a number is entered into it.

The output of the A register is single gated to the Select Y matrix 25. The Select Y matrix is connected to many sources of operands and in many operations involving the arithmetic circuits serves as a gating means for gating the operands into the arithmetic circuits. In the normalize instructions the Select Y matrix merely serves as a transfer path between the A register and the X register. The output of the A register is continuously applied to the Select Y matrix and upon occurrence of the command A to Y the value in the A register is gated through the Select Y matrix to the X register. The output of the Select Y matrix is double gated to the X register over transfer bus 27 and upon occurrence of the command Y to X the output of the select matrix is gated into the X register.

The D register is also a thirty-six bit register. The output of the A register is double gated to the D register over transfer bus 29 and upon occurrence of the command A to D (R1) the contents of the A register are entered into the D register with a shift of one position to the right.

The contents of the X and D registers are continuously applied to Adder 1 over transfer busses 31 and 33 and the adder continuously produces the sum obtained by subtracting the complement of D from X. Adder 1 may be a thirty-six bit adder normally used in arithmetic operations. However, in the normalize instructions the normal output of the adder is not utilized. Instead, the adder produces a pattern of output signals representing the result of half-adding the content of the D register to the content of the X register. This pattern of signals is applied to normalizer 3 over the transfer bus 35. Transfer bus 35 contains only thirty-four lines since the outputs from the sign stage and low order stage of the adder are not utilized in the normalized operation. As subsequently explained in greater detail, the normalizer determines the position of the most significant bit in the pattern of signals appearing on transfer bus 35. If a number in the A register is transferred through the X register to one input of the adder and is transferred to the D register with a shift of one position to the right and then applied to the second input of the adder then the position of the most significant bit in the pattern of signals appearing on bus 35 corresponds to the position of the most significant bit of the number in the A register.

The normalizer produces both a left shift count and a right shift count. The left shift count contains six binary bits and represents the characteristic or scale factor of the number in the A register. The left shift count is applied over bus 37 to the K1 register and upon occurrence of the command Characteristic to K1 is gated into the low orders of the K1 register. Since this is a single gated transfer the K1 register is cleared by the command Clear K1 immediately before the left shift count is entered.

The shift matrix is capable of right circular shifting a number up to 72 positions but cannot directly left shift a number. A left shift is accomplished by shifting to the right and end around by an amount equal to 72 minus the left shift count.

The right shift count produced by the normalizer is equal to 72 minus the left shift count and is applied over transfer bus 39 to the seven lower orders of the K3 register. Upon occurrence of the command Shift Count to K3 the right shift count is entered into the K3 register. This is a single digit transfer hence the K3 register is cleared by the command Clear K3 immediately before the shift count is entered therein.

The shift matrix comprises three levels of gates and has no storage ability. A number in the X register is continuously applied over bus 41 to the input of the first gating level. Decoder 13 decodes the two low order bits of the count in K3 and produces one of four output signals to cause the first gating level to shift the input number 0, 1, 2, or 3 bit positions to the right.

Figures 2, 3:
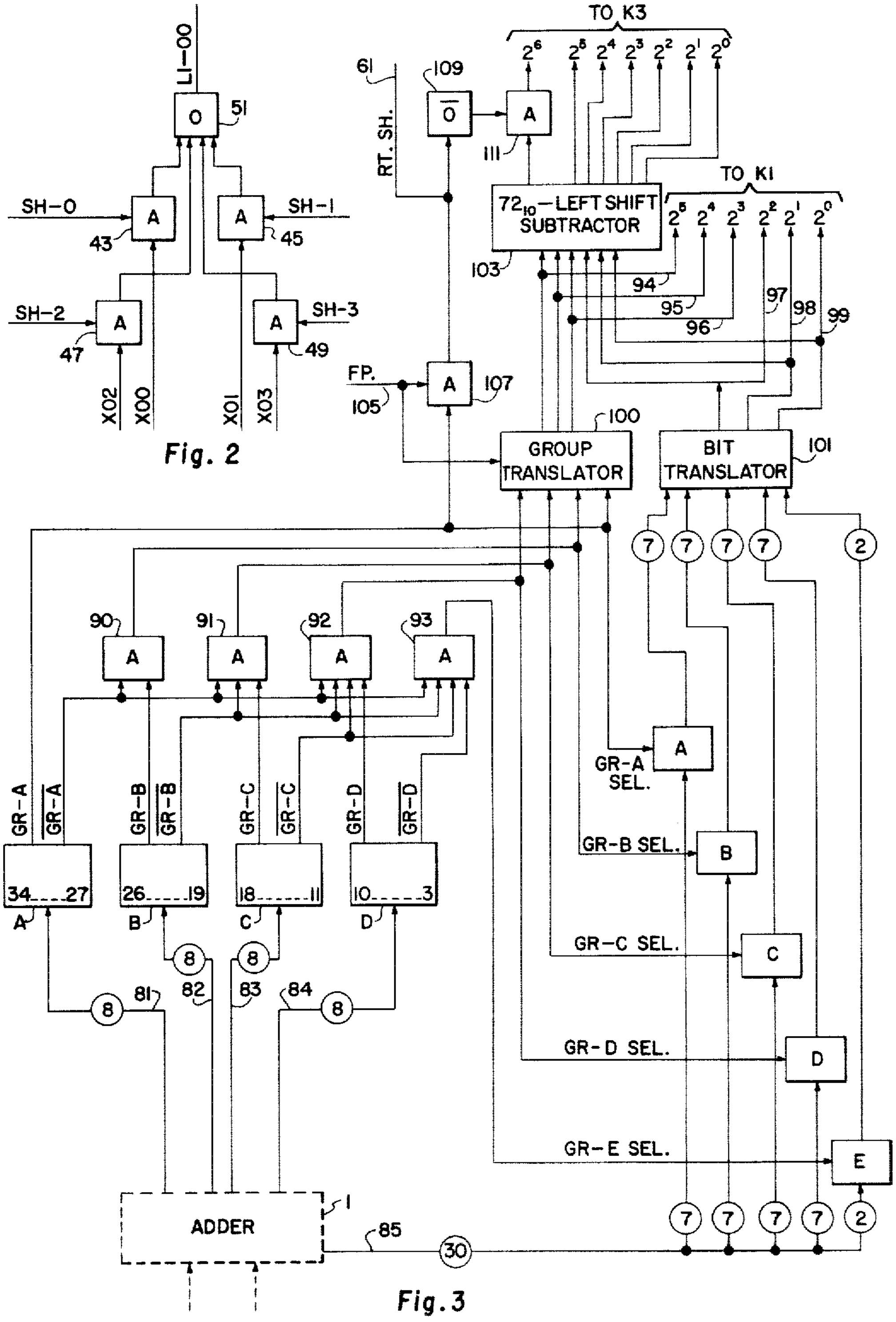
FIGURE 2 is a logical diagram of a single stage in one level of the shift matrix.
FIGURE 3 is a block diagram of the normalizer circuits for generating the right and left shift counts.

FIGURE 2 shows the logic for a typical stage of the first gating level. The stage includes four AND circuits or gates 43, 45, 47 and 49 each having an output connected to an OR circuit 51. Stage 00 is shown. Gate 43 has one input connected to X00 and another input which receives the signal SH–0 from decoder 13. If decoder 13 produces a signal SH–0 and stage X00 contains a binary 1 then the gate 43 produces a positive output signal which passes through OR circuit 51 and is applied to stage 00 of the second gating level.

Gate 45 has one input connected to X01 and another input connected to receive the signal SH–1 from decoder 13. If the decoder produces the signal SH–1 and stage X01 contains a binary 1 then gate 45 produces an output signal that passes through OR circuit 51 to stage 00 of the second gating level.

Gate 45 has one input connected to X02 and another input connected to receive the signal SH–2 from decoder 13. If the decoder produces the signal SH–2 and X02 contains a binary 1 then gate 47 produces an output signal which passes through OR circuit 51 to stage 00 of the second gating level.

Gate 49 has one input connected to X03 and another input connected to receive the signal SH–3. If decoder 13 produces the signal SH–3 and X03 contains a binary 1 then gate 49 produces an output signal that passes through OR circuit 51 to stage 00 of the second gating level.

The first gating level receives a thirty-six bit number from the X register and since this number may be shifted to the right either 0, 1, 2, or 3 bit positions this gating level is provided with thirty-nine outputs. These outputs are applied over bus 53 to the correspondingly numbered inputs of the second gating level.

Decoder 15 decodes bit positions 02 and 03 of the K3 register and produces one of four signals indicating whether the input to the second gating level is to be shifted to the right 0, 4, 8, or 12 positions. Since the second gating level receives a thirty-nine bit input number and the low order bit of this number may be shifted to the right up to twelve positions the second gating level has fifty-one outputs and these outputs are applied over bus 55 to the correspondingly numbered inputs of the third gating level.

Decoder 17 decodes bit positions 04, 05, and 06 of K3 and produces one of five output signals indicating whether the input to the third gating level is to be shifted to the right 0, 16, 32, 48, or 64 bit positions. The third gating level is connected to effect an end around shift for those numbers being shifted below position 71. For example, the input to position 50 of the third gating level is applied to five gates (not shown) each of which is conditioned by one of the output signals from decoder 17. The Shift-0 signal from decoder 17 gates input 50 of the third gating level to output position 50. The Shift-16 signal from decoder 17 gates the input 50 to output position 66. The Shift-32 signal from decoder 17 gates position 50 to output position 25. The Shift-48 signal from decoder 17 gates input 50 to output position 9 and the Shift-64 signal gates input 50 to output position 42.

The 72 bit output of the shift matrix is divided into an upper half containing bit positions 35 through 0 and the lower half containing bit positions 36 through 71. The output from the upper half of the gating matrix is continuously applied to the D register over bus 57 and the output from the lower half of the shift matrix is continuously applied to the D register over the bus 59. The command SML to D gates the output from the lower half of the shift matrix into the D register and the command SMU to D gates the output of the upper half of the shift matrix into the D register. Since the outputs from the shift matrix are single gated into the D register the D register is cleared by the command Clear D immediately before a transfer takes place.

It should be noted at this point that the SMU to D signal occurs during every normalize operation in order to enter the significant bits of the X register in the D register in the normalized position. This is true whether the normalize instruction specifies that the number be normalized in floating point or non-floating point format. An analysis will show that the significant bits are always presented at the outputs of the upper half of the shift matrix but not at the lower half. In cases where the most significant bit of the number in the X register must be shifted to the left in order to place the number in normalized form the command SML to D is generated simultaneously with the SMU to D command in order to fill sign bits into the low order positions of the D register which would otherwise be left vacant by the left shift.

In the case where the instruction calls for normalizing a word in floating point format and the most significant bit of the unnormalized number is to the left of bit position 26 in the X register then an effective right shift rather than a left shift is required. In this case the low order positions of the D register are not left vacant so there is no need to generate the command SML to D. In this latter case, the nine upper bits of the D register may or may not be vacant but they are subsequently cleared and then filled with the characteristic of the normalized number.

The scale factor or characteristic is produced by the K1, K2, and K3 registers and subtractor 5. Each of these registers and the subtractor contains nine bit positions handling the sign and eight bit characteristic or scale factor. In the following description it will be assumed that register K2 is cleared and contains the count of zero during the normalize operation. However, if desired, K2 may be loaded with a constant of some predetermined value.

When normalizing a word in non-floating point format the command Characteristic to K1 gates the left shift count from the normalizer into the K1 register. In this normalize operation the effective shift desired is always a left shift so the signal Right Shift produced on lead 61 of the normalizer 3 is negative. The Right Shift signal conditions the command generator 19 to produce the command K1–K2. Subtractor 5 continuously receives the outputs from the K1 and K2 registers and produces at one set of gates the difference obtained by subtracting K1 from K2 and presents at a second set of gates the difference obtained by subtracting K2 from K1. The command K1–K2 controls the latter set of gates so that this difference is transferred into the K3 register over transfer bus 63. This difference represents the scale factor of the number originally contained in the A register. The command Clear X clears the X register and the command K3 to X gates the scale factor on bus 65 into the nine low order bits of the X register. This scale factor may then be read out of the X register to the memory.

When the number is being normalized in floating point format and an effective left shift is necessary in order to normalize the number the left shift count is gated into K1 by the command Characteristic to K1. The sign of the original number in the A register determines whether the left shift count should or should not be complemented before being entered into the characteristic portion of the D register. The sign bit of the A register is applied to the command generator and if the sign is negative the command generator generates the command K1–K2 to gate this difference from the subtractor into K3 over transfer bus 63. If the sign of the number in the A register is positive the command generator generates the command K2–K1 and this command gates the output of the subtractor into K3 and over the transfer bus 67.

After the difference has been entered into K3 sign of the number in the A register is entered into the high order position of K3. The output from the sign position of the A register is applied to K3 and the command generator. The command generator generates the command A35 to K3 to gate the sign of the A register into the high order position of K3.

The characteristic of the floating point number is now contained in K3 and the normalized mantissa is contained in bit positions 0 through 26 of the D register. The command generator generates the command CL $D_{U9}$ to clear the upper nine bit positions of the D register. The command generator then generates the command K3 to $D_{U9}$ to gate the characteristic from K3 into the D register over transfer bus 71. The normalized word in floating point format is now contained in the D register. The command generator then generates the commands Clear A and D to A to clear the A register and transfer the floating point word into the A register.

The left shift count produced by normalizer 3 is not entered into the K1 register when a number is being normalized in floating point format and the most significant digit of the unnormalized number is to the left of bit position 26. The command Floating Point (FP) is produced by the command generator and applied to normalizer 3. If the most significant digit in the pattern of signals applied to the normalizer is in one of the bit positions 27 through 34 the normalizer produces the signal Right Shift on lead 61. This signal is applied to the command generator to inhibit the commands Characteristic to K1 and SML to D. The command generator produces the command Shift Count to K3 as described above and the right shift count is entered into the K3 register in the normal manner. This shift count is applied to the decoders to control the shifting of the value in the X register to the right as it is transferred into the D register.

The signal Right Shift produced by the normalizer also controls the command generator so that it produces the command $\overline{K3}$ to K1 to gate the complement of the right shift count from transfer bus 73 into the K1 register The sign of the A register is then sensed and the command generator produces one of the commands K1–K2 or K2–K1 depending upon whether the sign is negative or positive. In either event the resulting difference is entered into the K3 register. The command generator then produces the command A35 to K3 to gate the sign of the A register into the high order of K3 thus completing formation of the characteristic. The characteristic is entered into the nine higher orders of the D register by the commands CL $D_{U9}$ and K3 to $D_{U9}$. The normalized number in floating point format is then entered into the A register by the commands Clear A and D to A.

FIGURE 3 is a block diagram of the circuits included in normalizer 3. The operation of the normalizer circuit is based on the fact that when a number is shifted to the right one binary order and the shifted number is compared order by order with the original number the highest order indicating a non-comparison is the order of the original number containing the most significant bit. Example V illustrates this principle for a positive number. The most significant bit of the original number is in bit position 3 with other less significant bits appearing in posions 1 and 0. After the number is right shifted one position, the right shifted number contains significant bits in positions 2 and 0. When the original number is compared with the right shifted number a non-comparison is indicated in bit positions 1, 2 and 3. Note that the highest order indicating a non-comparison corresponds to the highest order of the original number that contained a significant bit.

| S | 6 | | | | | | 0 | | |
|---|---|---|---|---|---|---|---|---|---|
| 0 | 0 | 0 | 0 | 1 | 0 | 1 | 1 | X | Without Shift |
| 0 | 0 | 0 | 0 | 0 | 1 | 0 | 1 | D | Right Shifted |
| 0 | 0 | 0 | 0 | 1 | 1 | 1 | 0 | HA | |

EXAMPLE V

A comparison operation is nothing more than a half-add operation. Therefore, the present normalizer utilizes the half-add output of the adder normally found in the arithmetic circuits of a computer. The number without shift is applied to the X register and the number right shifted one position is entered into the D register. The outputs from these registers are applied to the adder which produces a pattern of output signals on transfer busses 81 through 85. This pattern of signals represents the result of comparing each stage of the X register with the corresponding stage of the D register.

The number being normalized is considered to be divided into five groups designated A, B, C, D, and E. Table I shows the bit positions of the number assigned to each group. The sign bit is not assigned to any group. Groups A, B, C, and D are each assigned eight bit positions and group E is assigned three bit positions.

| | A | B | C | D | E |
|---|---|---|---|---|---|
| | a b c d e f g h | a b c d e f g h | a b c d e f g h | a b c d e f g h | a b c |
| 35<br>0 | 34 27<br>0 0 0 0 0 0 0 0 | 26 19<br>0 0 0 0 0 0 0 0 | 18 11<br>0 0 0 0 0 0 0 0 | 10 3<br>0 0 0 0 0 0 1 0 | 2 0<br>1 0 1 |

TABLE I

The output signals resulting from the half-add operation are similarly divided into groups A, B, C, D, and E. Each group of signals except group E is applied to a group selector. Group selector A receives the half-add outputs from bit positions 27 through 34 of the half-adder, group selector B receives output signals from bit positions 19 through 26, group selector C receives output signals from bit positions 11 through 18, and group selector D receives output signals from bit positions 3 through 10. The purpose of each group selector is to determine whether or not any of the signals applied to it indicate a non-comparison.

Group selector A is shown in FIGURE 4 and comprises a gate 86 and a negative OR circuit 88. A negative OR circuit is defined as a circuit which produces a positive output signal only when all of its inputs are negative. Gate 86 is connected to the outputs of stages 27 through 34 of the half-adder. These are the stages assigned to group A. If stages 27 through 34 of the X register compare with stages 27 through 34 of the D register then all inputs to gate 86 are positive and it produces the positive output signal $\overline{\text{Group A}}$. On the other hand, if any one or more of stages 27 through 34 of the X register does not compare with the corresponding stage of the D register then one or more of the inputs to gate 86 is negative and the gate produces a negative output signal. This signal is inverted at $\overline{O}$ 88 and becomes the positive signal Group A. When the signal Group A is positive it indicates that the most significant digit of the number being normalized is in one of the bit positions 27 through 34.

Group selectors B, C, and D are similar to group selector A. However, when one of the group selectors B, C, or D produces a group signal this signal merely means that one of the bit positions assigned to the group contains a significant bit. Whether or not this bit is the most significant bit of the number depends upon whether or not a higher order group selector is producing a group signal. For example, groups B, C, and D may all produce group signals while selector A produces the signal $\overline{\text{Group A}}$. Under these conditions B is the group that contains the most significant bit of the number. Four gates 90, 91, 92, and 93 are provided for determining the highest order group selector producing a group select signal.

Group selector A is the highest order group selector. If group selector A produces the Group A signal this is an indication that the most significant bit is in group A. The signal $\overline{\text{Group A}}$ is negative and is applied to one input of each of the gates 90 through 93 to block each of these gates and prevent them from passing the group B, C, D, or E signals. Gate 90 also receives the group B signal. When the most significant bit of a number is in group B the signal $\overline{\text{Group A}}$ is positive and the signal Group B is positive so that gate 90 produces a positive output signal. At the same time, the signal $\overline{\text{Group B}}$ is negative and this signal is applied to one input of each of the gates 91, 92, and 93 to block these gates.

If the most significant bit of the number is in group C the signal Group C is positive and the signals $\overline{\text{Group A}}$ and $\overline{\text{Group B}}$ are also positive so gate 91 produces a positive output signal. At the same time, the signal $\overline{\text{Group C}}$ is negative and it is applied to one input of 92 and 93 to block these gates.

When the most significant digit of the number is in group D, the signal Group D is positive as are the signals $\overline{\text{Group A}}$, $\overline{\text{Group B}}$, and $\overline{\text{Group C}}$. With all inputs positive gate 92 produces a positive output signal. The signal $\overline{\text{Group D}}$ is negative at this time to block gate 93.

When the most significant digit of the number is in group E the signals $\overline{\text{Group A}}$, $\overline{\text{Group B}}$, $\overline{\text{Group C}}$, and $\overline{\text{Group D}}$ are all positive and condition gate 93 to produce the positive signal Group E Select.

The Group A signal and the output signals from gate 90 through 93 are applied to a group translator 100 to generate the three high order bits of a six bit number. This number is called the left shift count and represents the amount by which an unnormalized number must be effectively shifted to the left in order to place the most significant bit adjacent the decimal point. The left shift count is transferred to the K1 register and becomes the scale factor in a non-floating point normalizing operation. The left shift count is also transferred to K1 and becomes the characteristic in a floating point normalizing operation if the most significant bit of the unnormalized number is not in Group A.

The normalizer is provided with five bit selectors designated A, B, C, D, and E. The purpose of these bit selectors is to determine the position of the most significant bit within the selected group. Bit selectors A, B, C, and D each receive seven input signals resulting from the half-add operation. As shown in Table I each of these groups contains eight bits. The seven high order bits are the ones applied to the bit selectors. The bit selectors operate on the assumption that if a given group select signal is generated and the most significant bit is not in any of the seven higher order bit positions of the selected group then it must be in the low order position of the selected group. Thus, the half-add outputs from stages 27, 19, 11, and 3 are not applied to the bit selectors.

Table I shows that group E contains only three bits. Only two of these bits are applied to bit selector E. The output from stage 0 of the half-adder is not applied to the bit selector. The assumption is made that if the most significant bit is in group E and is not in bit positions 2 or 1 then it must be in bit position 0.

The bit selector can produce an output signal only if it is energized by the corresponding group select signal. Each bit selector has seven outputs corresponding to the seven inputs from the half-adder. When a particular bit selector is selected by a group select signal it produces positive output signals on each of its output lines for all positions to the left of the one containing the most significant bit.

All outputs from all bit selectors are applied to a bit translator 101 which generates the three low order bits of the shift count. The binary value of these three bits corresponds to the number of positions the most significant bit of the selected group must be shifted to the left in order to place it in the highest order assigned to the group.

The left shift count produced by the group and bit translators is applied as the subtrahend to a subtractor 130. The subtractor is permanently wired so that it has as a minuend input the binary equivalent of the decimal value 72. The minuend is chosen as 72 because this is the number of positions by which the number can be shifted by the shift matrix in a right shifting operation. Since a left shift is desired but cannot be accomplished directly by a left shift operation it is effectively accomplished by right shifting by an amount equal to $72_{10}$ minus the left shift count. Subtractor 103 performs the subtraction and produces at its output a seven bit binary number representing the number of right shifts required in order to effect the desired left shift.

When a number is being normalized in floating point format the number of left shifts required is eight less than the number of shifts required when normalizing in non-floating point format. In the former case the decimal point is considered to be to the left of bit position 26 and in the latter case the decimal point is considered to be to the left of bit position 34. The command FP is supplied by the command generator and is applied over lead 105 the group translator 100 to modify the left shift count produced by the translator.

When a number is being normalized in floating point format and the most significant bit of the unnormalized number is in one of the bit positions assigned to group A then the number must be right shifted rather than left shifted in order to put the most significant bit in position 26. To obtain the correct right shift count the left shift count is generated in the usual manner and applied to subtractor 103. However, the output from the high order of the subtractor is inhibited. The command FP is applied to gate 107 which is further conditioned by the Group A select signal if the most significant bit of the number is in group A. Gate 107 produces a positive output signal that is inverted at $\overline{O}$ 109 and applied to gate 111 to inhibit the output from the high order of the subtractor.

FIGURE 5 shows the logic of some of the elements shown in block form in FIGURE 3. A single stage of the half-adder comprises two gates 113 and 115 each having an output connected to a negative OR circuit 117. The output of $\overline{O}$ 117 is inverted at $\overline{O}$ 119 to become the signal HA–04. Gate 113 receives the signals $\overline{\text{X04}}$ and $\overline{\text{D04}}$ and gate 115 receives the signals X04 and D04. If the bits stored in stage 4 of the X and D registers are both 1's then both inputs to gate 115 are positive and it produces a positive output signal that is inverted at $\overline{O}$ 117 and inverted again at $\overline{O}$ 119 so that the signal HA–04 is positive. If the bits in stages 4 of the X and D registers are equal and are both 0 then both inputs to gate 113 are positive and the positive output signal from this gate is inverted at $\overline{O}$ 117 and inverted again at $\overline{O}$ 119 to produce a positive output signal. If the binary bit in stage 4 of the X register is not equal to the binary bit in stage 4 of the D register then at least one input of each of the gates 113 and 115 is negative and the gates both produce negative output signals. With both inputs negative $\overline{O}$ 117 produces a positive output signal that is inverted at 119 to become the negative signal HA–04. Thus, the signal HA–04 is negative only when the bits in stage 4 of the X and D registers are compared and found to be unequal. The remaining stages of the half-adder may be similar to the one shown.

As shown in FIGURE 5 group selector D comprises a series of seven gates 120 through 126. Gate 120 receives as one input the group D select signal and as the other input the output from stage 10 of the half-adder. As shown in Table I above, stage 10 corresponds to the highest order bit position assigned to Group D. The output of gate 120 is connected to one input of a gate 121 which receives as its second input the output from stage 9 of the half-adder. In a similar manner, gates 122 through 126 have one input connected to stages HA–08 through HA–04, respectively, with the second input for each of these gates being derived from the output of the preceding gate in the series. The output of each gate in the series is applied to the bit translator 101.

The bit translator comprises a plurality of negative OR circuits 127 through 140, a plurality of gates 141 through 146, a plurality of positive OR circuits 147 through 149 and three bistable flip-flops 150 through 152. $\overline{O}$ 127 has five inputs. These inputs are connected to the outputs of the first gates in each of the five bit selectors. $\overline{O}$ 128 also has five inputs and these inputs are connected to the outputs of the second gates in each of the five bit selectors. Each of the negative OR circuits 129 through 133 is connected to receive the outputs from corresponding gates in bit selectors A, B, C, and D. $\overline{O}$ 129 receives the outputs from the third gates in each bit selector, $\overline{O}$ 130 receives the outputs from the fourth gates in each bit selector, and so forth.

The output of $\overline{O}$ 127 is inverted at $\overline{O}$ 134 and applied to one input of gate 141. The output of $\overline{O}$ 128 is applied to gate 141 and is applied through $\overline{O}$ 135 to gate 142. The output of $\overline{O}$ 129 is applied to gate 142 and is applied through $\overline{O}$ 136 to gate 143. The output of $\overline{O}$ is applied to gate 143 and is applied through $\overline{O}$ 137 to gate 144. The output of $\overline{O}$ 131 is applied to gate 144 and is applied through $\overline{O}$ 138 to gate 145. The output of $\overline{O}$ 132 is applied to gate 145 and is applied through $\overline{O}$ 139 to gate 146. The output of $\overline{O}$ 133 is applied to gate 146 and to $\overline{O}$ 140.

Each of the gates 141 through 146 has its output connected to $\overline{O}$ 140. In addition, the output of gate 141 is connected to OR circuit 149, the output of gate 142 is connected to OR circuit 148, the output of gate 143 is connected to OR circuits 148 and 149, the output of gate 144 is connected to OR circuit 147, the output of gate 145 is connected to OR circuits 147 and 149, and the output of gate 146 is connected to OR circuits 147 and 148. The output of $\overline{O}$ 140 is applied to OR circuits 147, 148, and 149.

As subsequently illustrated by specific examples, the bit translator receives inputs from the bit selectors, determines the position of the most significant bit in the selected group, and generates a three bit binary number indicating the number of positions the most significant bit must be shifted to the left in order to place it in the highest order assigned to the selected group. This binary number appears at the outputs of OR circuits 147 through 149 and is applied over leads 153 through 155 to the subtractor 103. In addition, the three bits are stored in flip-flops 150 through 152. The output of these flip-flops represents the three lower orders of the left shift count.

Group selector 100 comprises a plurality of negative OR circuits 156 through 161, a plurality of gates 162 through 166, a pair of positive OR circuits 167 and 168, and three bistable flip-flops 169, 170, and 171.

The Group D Select signal is applied to $\overline{O}$ 156, $\overline{O}$ 157, $\overline{O}$ 158, and gate 164. The Group B Select signal is applied to $\overline{O}$ 156, $\overline{O}$ 158, and gate 162. The Group C Select signal is applied to $\overline{O}$ 156, $\overline{O}$ 157, and gate 163. The Group A Select signal is applied to $\overline{O}$ 156. The command FP appearing on lead 105 is applied to $\overline{O}$ 159 and gates 162, 163, 164, and 165.

The output of $\overline{O}$ 159 is connected to one input of gate 166 and the second input of this gate is connected to the output of $\overline{O}$ 156. The output of gate 166 is connected to the set input terminal of flip-flop 169 and is also connected to stage 5 of the subtractor 103.

The output of $\overline{O}$ 156 is applied to gate 165 and the output of this gate is connected to one input of each of the OR circuits 167 and 168. The outputs from $\overline{O}$ 157 and gate 163 are applied to $\overline{O}$ 160 and the output of 160 is applied to a second input of OR circuit 167. The output of 167 is connected to flip-flop 170 and to stage 4 of the subtractor. The output of $\overline{O}$ 158 and the outputs from gates 162 and 164 are all applied to $\overline{O}$ 161. The output of 161 is applied to OR circuit 168. The output of gate 163 is applied to a third input of gate 168. The output of 168 is connected to flip-flop 171 and stage 3 of the subtractor.

The outputs from gate 166 and OR circuits 167 and 168 represent the three high orders of the left shift count. These bits are stored in flip-flops 169 through 171 until after the left shift count is entered into K1 by the command Characteristic to K1. The flip-flops 169 through 171 of the groups translator as well as flip-flops 150 through 152 of the bit translator are reset immediately after the left shift count is entered into K1.

Subtractor 103 subtracts the left shift count from $72_{10}$. The low order output $2^0$ is derived directly from the output of OR circuit 149 in the bit translator. The reason is that if the left shift count is odd then the right shift count must also be odd. Outputs $2^1$ and $2^2$ of the subtractor are obtained directly from a translation of the outputs of the bit selectors. OR circuit 172 comprises stage 1 of the subtractor. This OR circuit is connected to the outputs of gate 141, 142, 145, and 146 of the bit translator. OR circuit 173 comprises the second stage of the subtractor and this circuit is connected to the outputs of gates 141, 142, 143, and 144 of the bit translator.

The three low orders of the right shift count produced by subtractor 103 are in effect the result of subtracting the left shift count from the value 8. Therefore, if any one of the three low orders of the left shift count is a binary 1 then there must be a borrow from stage 3 in the subtractor. The outputs of OR circuits 147, 148, and 149 are all applied to OR circuit 174 and the output of 174 is applied over lead 175 to the borrow input of stage 3.

Stages 3 through 6 of the subtractor may be of conventional design. However, the minuend inputs of these stages are connected to voltage sources so that stages 3 and 6 continually receives 1's as inputs while stages 4 and 5 continually receive 0's as inputs.

NUMERICAL EXAMPLES

*Example 1.*—Assume that the A register contains the number shown in Table I. Assume further that it is desired to generate the scale factor of this number and place the number in normalized non-floating point format. The instruction Normalize $\overline{FP}$ is applied to command generator 19. The command generator generates the command A to Y and then the command Y to X in order to transfer the number in the A register to the X register. The command generator then generates the command A to D (R1) to right shift the number one position and place it in the D register.

The half-adder half-adds or compares corresponding positions of the X and D registers. Stages 5 through 34 all produce positive output signals indicating a comparison and stages 0 through 4 produce negative signals indicating a non-comparison. Thus, all inputs to group selectors A, B, and C are positive. Group selector A produces the signal $\overline{\text{Group A}}$, Group selector B produces the signal $\overline{\text{Group B}}$, and group selector C produces the signal $\overline{\text{Group C}}$. The negative outputs from stages 3 and 4 of the half-adder cause group selector D to produce the signal Group D. As a result, all inputs to AND gate 92 (FIGURE 3) are positive and the gate produces the positive signal Group D Select. All other group select signals are negative.

In FIGURE 5, all output signals from bit selectors

A, B, C, and E are negative since the corresponding group select signals are negative. Bit selector D is receiving positive signals from stages 5 through 10 of the half-adder, a negative signal from stage 4 of the half-adder, and the positive signal Group D Select. The Group D Select signal passes through gates 120, 121, 122, 123, 124, and 125 but is blocked at gate 126. The positive output from gate 121 causes $\overline{O}$ 128 to produce a negative output signal to block gate 141. In like manner, the positive output signals from gates 122 through 125 cause negative OR circuits 129 through 132 to produce negative output signals to block gates 142 through 145. The negative output of $\overline{O}$ 132 is inverted at $\overline{O}$ 139 and conditions one input of gate 146. All inputs to $\overline{O}$ 133 are negative so it produces a positive output signal to condition the second input of gate 146. The output signal from gate 146 passes through 147 to set flip-flop 150 and also passes through 148 to set flip-flop 151. Thus, the three low order bits of the left shift count are 110.

The signal FP on lead 105 of FIGURE 5 is negative because this is not a floating point normalizing operation. The negative signal blocks gates 162, 163, and 164 causing the signals on leads 180, 181, and 182 to be negative. The positive signal Group D Select causes $\overline{O}$ 157 to produce a negative output signal on lead 184 and $\overline{O}$ 158 to produce a negative output signal on lead 185. With leads 180 and 184 both negative $\overline{O}$ 160 produces a positive output signal that passes through 167 to set flip-flop 170.

With leads 181, 182, and 185 all negative $\overline{O}$ 161 produces a positive output signal that passes through 168 to set flip-flop 171.

The Group D Select signal is inverted in $\overline{O}$ 156 to block gate 166 so flip-flop 169 is not set. Therefore, the three high order bits of the left shift count are 011.

Combining the outputs of the group translator and the bit translator the left shift count is 011110 which is the binary equivalent of the decimal value 30. This is the correct value for the left shift count for, as shown in Table I, it requires a left shift of thirty binary orders in order to shift the most significant bit of the number from bit position 4 to bit position 34.

The right shift count is produced at the same time as the left shift count. The right shift count is derived as follows. The output of OR circuit 149 in the bit translator is negative so that the output of stage 0 of subtractor 103 is a binary 0. The positive output of gate 146 in the bit translator passes over lead 187 and through OR circuit 172 so that the output of stage 1 of the subtractor is a binary 1. Gates 141 through 144 of the bit translator are all blocked so all inputs to OR circuit 173 in the subtractor are negative. Therefore, stage 2 of the subtractor produces a binary 0 output.

The four high order stages of the subtractor are receiving the binary value 1001 as a minuend input. The value 011 produced by the group translator is subtracted from this value. In addition, there is a borrow of 1 into stage 3. The outputs of 147 and 148 in the bit translator are both positive so OR circuit 174 produces the borrow signal on lead 175. Taking into account the borrow the output of the four high order stages of the subtractor is 0101. The whole binary output of subtractor 103 represents the right shift count and has the value 0101010.

The command generator produces the commands Clear K3 and Shift Count to K3 in order to enter the right shift count in the K3 register.

Decoder 13 decodes the two low orders of K3 and sets up the first gating level of the shift matrix for a right shift of two positions. Decoder 15 decodes the next two positions of K3 and sets this second gating level up for a shift of eight places to the right. Decoder 17 decodes the next three high positions of K3 and sets the third gating level up for a right end around shift of 32 positions.

The output of the X register is continuously applied to the shift matrix so at this time the value in the X register is appearing at the outputs of the third gating level in shifted form. Referring again to Table I, the bits 010101 in bit positions 5 through 0 of the original number are appearing in output positions 35 through 30, respectively, of the third gating level. The binary 0's in positions 35 through 6 of the original number are appearing in output positions 42 through 71 of the third gating level.

The command generator produces the command Clear D and then the commaned SMU to D. The latter command enters the value 010101 into the high order positions of the D register. Next, the command generator produces the command SML to D to enter the 0's at output positions 42 through 71 into bit positions 29 through 0 of the D register. This completes the formation of the normalized number.

After the number has been normalized the command generator produces the commands Clear K1 and Characteristic to K1 to enter the left shift count into the K1 register. The command K1–K2 then gates the output of K1 through subtractor 5 to the K3 register. Register K2 is assumed to contain a zero value so the value entered into the K3 is the left shift count. The command generator then produces the commands Clear X and K3 to X to enter the scale factor of the normalized number into the low order bits of the X register.

*Example 2.*—Assume that it is desired to convert the unnormalized number shown in Table I into a normalized number in floating point format. The instruction entered into the command generator is Normalize FP. The command generator produces the commands A to Y, Y to X, and A to D ($R_1$) as described for the preceding example. In FIGURES 3 and 5 the operation of the group selectors, bit selectors and bit translators is exactly the same as for the preceding example. Therefore, the three low orders of the left shift and right shift counts are the same as for the preceding example.

This is a floating point normalizing operation so the command generator produces the positive command FP. This command is applied to the group translator over lead 105 and is inverted at $\overline{O}$ 159 to block gate 166. Therefore, the high order of the left shift count is a binary 0.

The Group B Select signal is positive so both inputs to gate 164 are conditioned and the gate produces a positive output signal on lead 182. $\overline{O}$ 161 inverts this signal so a negative signal is applied to 168 over lead 190. The Group C Select signal is negative and blocks gate 163. The negative output from 163 is applied to 168 over lead 180. The positive Group D Select signal is inverted at $\overline{O}$ 156 and blocks gate 165. This makes lead 191 negative. With all inputs negative OR circuit 168 produces a negative output signal. Therefore, bit position 4 of the left shift count is a binary 0.

The positive signal Group D Select is inverted at $\overline{O}$ 157 so that the signal on lead 184 is negative. With leads 180 and 184 both negative $\overline{O}$ 160 produces a positive output signal that passes through 167 to set flip-flop 170. Therefore, bit position 5 of the left shift count is a binary 1. Combining the outputs from the group and bit translators the left shift count has the value 0010110.

The three low order bits of the right shift count are produced by subtractor 103 in exactly the same manner as for the first example. The borrow signal on lead 175 is also produced in the same way. The minuend input to the four high order stages of the subtractor is 1001 and the subtrahend input to these stages as obtained from the group translator is 010. Subtracting the subtrahend from the minuend and taking into account the borrow on lead 175 the resulting output from the high order stages of the subtractor is 0110. Considering all seven outputs from subtractor 103 the right shift count is 0110010.

The command generator produces the commands Clear K3 and Shift Count to K3 to enter the right shift count into the K3 register and set up the shift matrix. Decoder 13 decodes the two low order bits of the right shift count and controls the first gating level for a right shift of two positions to the right. Decoder 15 decodes the next two orders of K3 and since both orders are zero the decoder controls the second gating level for a zero shift to the right. Decoder 17 decodes the next three orders of K3 and controls the third gating level for a shift of forty-eight places to the right. Therefore, the number in the X register appears at the output of the third gating level shifted fifty places to the right and end around.

The command generator produces the command SMU to D to gate the output from the upper half of the shift matrix into the D register. This places the binary bits originally contained in bits 13 through 0 of the X register in bit positions 35 through 22 of the D register. The most significant bit originally contained in X4 now appears adjacent the decimal point in position D26.

The command generator generates the command SML to D to gate the lower half of the shift matrix into the D register. This enters the binary 0's originally contained in positions 35 through 14 of the X register into the twenty-two low order positions of the D register.

The command generator produces the commands Clear K1 and Characteristic to K1 to enter the left shift count in the K1 register. The command generator senses the sign bit of the number in the A register and since the sign of the number is positive the command generator produces the command K2–K1. Since the K2 register is assumed to have a zero value stored therein the effect is to enter the complement of the left shift count into K3. Therefore, K3 contains the value 111101001.

The command generator produces the command A35 to K3 to gate the sign of the original number into the high order position of the K3 register. The K3 register now contains the value 011101001. The command generator produces the commands Clear $D_{U9}$ and K3 to $D_{U9}$ to transfer the characteristic from K3 to the upper nine bits of the D register. At this time the D register contains the normalized number and its characteristic arranged in floating point format. The command generator then produces the commands Clear A and D to A to transfer the normalized number and its characteristic into the A register.

*Example 3*.—Assume that it is desired to convert the binary number shown in Example VI into a normalized number in floating point format.

```
35 34      27 26      19 18      11 10      3  2  0
 0 01000000 00000000 00000000 00000000 000
```

EXAMPLE VI

This requires that the most significant digit contained in position 33 be shifted until it is located in bit position 26. A shift of seven positions is required. Furthermore, this shift must be the right shift as opposed to Examples 1 and 2 where the effective shift had to be a left shift.

The instruction Normalize FP is applied to the command generator and the command generator produces the commands A to Y, Y to X, and A to D (R1) as for the preceding examples.

Bit positions 33 and 32 of the half-adder sense noncomparisons and produce negative output signals. All other outputs of the half-adder are positive. The negative signals are applied to group selector A and it produces the positive Group A Select signal. In FIGURE 3, the signal $\overline{\text{Group A}}$ is negative and blocks gates 90 through 93.

In FIGURE 5, all outputs from bit selectors B, C, D, and E are negative because the corresponding group select signals are negative. The first gate of bit selector A produces a positive output signal because position 34 of the half-adder is producing a positive output signal.

This signal appears on the lead A*a* and is inverted at $\overline{O}$ 127 and inverted again at $\overline{O}$ 134 to condition one input of gate 141. The second gate of bit selector A produces a negative output signal because of the negative output from bit position 33 of the half-adder. This signal appears on the lead A*b*. All inputs to $\overline{O}$ 128 are negative so it produces a positive output signal to condition the second input of gate 141. The output of $\overline{O}$ 128 is inverted at $\overline{O}$ 135 to block gate 142. The third through seventh gates of bit selector A produce negative output signals that are applied to negative OR circuits 129 through 133. Since all of their inputs are negative the negative OR circuits produce positive output signals that are first inverted and then applied to gates 143 through 146 to block the gates.

The left shift count may be ignored since it is not utilized in a floating point operation where a right shift is required. The right shift count is produced in the following manner. Gate 141 of the bit translator produces a positive output signal since both of its inputs are conditions. This signal passes through 149 and on to lead 155 so that the stage 0 output of subtractor 103 is a binary 1. The output of gate 141 also passes through 172 and 173 so that the output signals from stages 1 and 2 of the subtractor are also binary 1's.

All three outputs from group translator 100 are binary 0's. The Group A Select signal is positive and is inverted at $\overline{O}$ 156 to block gates 165 and 166. The Group D Select and Group C Select signals are both negative so $\overline{O}$ 157 produces a positive output signal that is inverted at $\overline{O}$ 160. The Group C Select signal is negative and blocks gate 163 so the signal on lead 180 is negative. The Group B Select and Group D Select signals are both negative so $\overline{O}$ 158 produces a positive output signal that is inverted at $\overline{O}$ 161 to become a negative signal on lead 190. Therefore, the outputs from 166, 167, and 168 are all 0.

The four high orders of subtractor 103 receive as a minuend input the value 1001 and as the subtrahend input the value 0000. In addition, the positive output from 149 passes through 174 to become a borrow signal on lead 175. Therefore, the output of the four high order stages of the subtractor is 1000 and the full output of the subtractor is 1000111.

The output of subtractor 103 must be modified in order to produce the correct right shift count when a floating point normalizing operation takes place and a right shift is required in order to normalize the number. The right shift is required if the most significant bit of the number being normalized is in one of the bit positions 27 through 34.

Referring to FIGURE 3, the positive Group A Select signal is applied to one input of gate 107. Since this is a floating point operation the signal FP on lead 105 is also positive and gate 107 produces a positive output signal. This signal is inverted at $\overline{O}$ 109 to block the output from the high order of subtractor 103. This changes the right shift count to the binary value 0000111. The command generator produces the commands Clear K3 and Shift Count to K3 to enter this value into the K3 register where it can control the right shift matrix.

Decoder 13 senses the two low orders of K3 and since both orders contain binary 1's decoder 13 produces an output signal to control the first gating level for a shift of three positions to the right. Decoder 15 senses the next two orders of K3 and produces a signal to control the second gating level for a shift of four positions to the right. Bit positions 4, 5, and 6 are sensed by decoder 17 and since all of these bits are 0's the decoder produces an output signal to the third gating level calling for a 0 shift to the right.

The command generator produces the commands Clear D and SMU to D thus gating the upper half of the shift matrix into the D register. This places bits 35 through 7 of the original number in bit positions 28 through 0 of the D register. The most significant digit ends up in bit position 26 of the D register.

The output of gate 107 (FIGURE 3) becomes the signal Right Shift appearing on lead 61. This signal is applied to the command generator and prevents the command generator from producing the commands SML to D and Characteristic to K1. In response to the signal on lead 61 the command generator produces the command $\overline{K3}$ to K1 which gates the complement of the value in K3 into the K1 register.

The command generator next senses the sign of the original number in the A register and since this sign is positive the command generator produces the command K2–K1. This command gates the content of K1 through subtractor 5 into the K3 register. K3 now contains the nine bit number 000000111.

The command generator next produces the command A35 to K3 thus gating the sign of the original number into the high order of the K3 register. K3 now contains the characteristic which is 000000111.

The command generator produces the commands Clear $D_{U9}$ and K3 to $D_{U9}$ to clear the upper nine bits of the D register and enter the characteristic therein. The normalized floating point number and its characteristic are now contained in the D register. The command generator next produces the commands Clear A and D to A to transfer the normalized number and its characteristic to the A register.

While novel features of the present invention have been described in connection with a specific embodiment, various modifications falling within the spirit and scope of the invention will be obvious. For example, a technique of the prior art involves the use of a biased number as the characteristic. The present invention is admirably suited for use in a computer system wherein the characteristic of a floating point number is biased. This bias may be added to the characteristic as the characteristic is generated during the normalize operation by inserting the bias value in the K2 register.

Furthermore, if a sign extension means is provided for extending the sign during the right shift transfer from the A register to the D register, the shift need not be limited to one binary order. Thus, if sign extension means are provided the right shift may be for two, three, four or more orders without affecting the end result of the normalize operation.

The embodiments of the invention in which an exclusive property or privilege is claimed are defined as follows:

1. A scale factor generator for generating the scale factor of a binary number divided into a plurality of groups each containing a plurality of binary orders, said generator comprising: comparing means responsive to signals representing said binary number and a second binary number for producing comparison signals indicating the orders of said first number that are not equal to the corresponding orders of said second number; means responsive to said comparison signals for producing group signals indicative to the group of said first binary number that contains the most significant bit; means responsive to said group signals for producing signals indicative of the higher orders of said scale factor; and means responsive to said group signals and said comparison signals for producing signals indicative of the lower orders of said scale factor.

2. A scale factor generator as claimed in claim 1 and further including means for producing as said second binary number a number having one-half the value of said first number.

3. The combination comprising: a first register for storing a first binary number having a plurality of groups, each group having a plurality of binary bits; a second register for storing a second binary number having a value equal to one-half the value of said first binary number; means responsive to said first and second registers for half-adding the numbers stored therein to produce a pattern of sum signals; a plurality of group selector means responsive to groups of said sum signals for producing group signals representing the highest order group of said first number that contains a significant bit; first translator means responsive to said group selector means for producing the high order bits of a scale factor; a plurality of bit selector means responsive to said sum signals and said group signals for producing bit signals indicating the position of the most significant bit in the highest ordered group containing a significant bit; and bit translator means responsive to said bit selector means for producing the low order bits of said scale factor.

4. The combination as claimed in claim 3 wherein all of the groups of said first binary number do not contain the same number of bits.

5. The combination as claimed in claim 4 wherein the number of bit selector means is one greater than the number of group selector means.

6. The combination comprising: means for storing a numerical value as a first binary number in the form of a sign bit and a plurality of bits arbitrarily grouped into a plurality of groups; means for storing a second binary number having a value of one-half the value of said first binary number; means for half-adding said first and second numbers to produce a plurality of sum bits, said sum bits being grouped into a plurality of groups corresponding to the groups for said first number; a plurality of group selector means each responsive to the sum bits of a given group for producing group select signals indicating the group of said first number that contains the most significant bit of said first number; a plurality of bit selector means each responsive to a group select signal and sum bits of the corresponding group for producing bit select signals indicative of the most significant bit in the selected group; bit transfer means responsive to said bit select signals for producing the low order bits of a left shift count; and group translator means responsive to said group select signals for producing the high order bits of said left shift count.

7. The combination as claimed in claim 6 wherein the number of group selectors is one less than the number of groups of sum bits.

8. The combination as claimed in claim 6 wherein each bit selector receives all the sum bits of a particular group except the least significant bit of said particular group.

9. The combination as claimed in claim 6 wherein said left shift count represents in binary form the number of bit positions the bits in said first number should be shifted left in order to place the most significant bit of said first number adjacent its sign bit, said combination further comprising: an N bit circular shift device for right shifting up to N bit positions a number applied thereto from said first storage means; a subtractor having as one input a constant value N and as the other input said left shift count, the difference produced by said subtractor representing a right shift count; and shift control means responsive to said right shift count for controlling said shift device whereby the most significant bit of said binary number appears at the output of said shift device in the bit position adjacent the sign position.

10. The combination as claimed in claim 9 and further comprising means for storing said left shift count.

11. The combination as claimed in claim 6 and further comprising an N bit circular shift device responsive to said first storage means for right circular shifting said first binary number, a subtractor for subtracting said left shift count from the value N to obtain a right shift count; means responsive to said subtractor for controlling said shift device to shift said first binary number; register means for storing said shifted first binary number and its sign; and means for storing said left shift count.

12 A normalizer for converting an N-bit binary number in non-floating point format to a binary number in floating point format, said number in each of said formats having a sign bit and a plurality of groups of numerical bits the most significant group of bits of said number in floating point format representing the characteristic of said number, said normalizer comprising: first register means for storing said number; means for right shifting said number; means responsive to said register means and said shifting means for half-adding said number to said right shifted number to produce a plurality of groups of sum bits; group selector means responsive to said groups of sum bits for producing group select signals indicating the group of said sum bits that contains the most significant bit; bit selector means responsive to at least some of said sum bits and said group select signals for producing bit select signals indicating the location of the most significant sum bit within the selected group; translator means responsive to said group select bit and bit select signals for producing a left shift count; second register means; right shift control means responsive to said first register means for right circular shifting said binary number into said second register means with a right shift of up to KN bit positions; subtract means responsive to said left shift count for producing a right shift count; said right shift control means being responsive to said right shift count for controlling the right shift of said binary number into said second register means; and means operative in the absence of a select signal from the group selector for the most significant group for entering said left shift count into the positions of the most significant group of bits in said second register means.

13. A normalizer as claimed in claim 12 wherein said last named means includes means operative when the sign of said number is positive for entering the complement of said left shift count into the positions of the most signficant group of bits in said second register means.

14. A normalizer as claimed in claim 13 wherein said substract means includes means responsive to a select signal from the group selector for the most significant group for generating as said right shift count the value KN–M where K is an integer and M is the number of bits in the most significant group, and means for entering said right shift count into the positions of the most significant group of bits in said second register means.

15. A normalizer as claimed in claim 14 wherein said means fo rentering said right shift count includes means responsive to the sign of said number when it is negative for entering the complement of said right shift count into the positions of the most significant group of bits in said second register means.

16. A normalizer device for converting a binary number from normal format to a floating point format, said number in normal format having N bits including a sign bit and $N-1$ bits arbitrarily divided into a plurality of groups A, B, C . . . in descending order of numerical significance, said number in floating point format having N bits including a sign bit, a characteristic portion having the same number of bits as said group A; and a mantissa portion, said normalizer comprising: a first register for storing said number in said normal format; a second register for storing a numerical value; half-adder means responsive to said first and second registers for producing $N-1$ sum bits, said sum bits being grouped in correspondence with the groups of said number in said first register; group select means responsive to said sum bits for selectively producing one of a plurality of group select signals corresponding to the group containing the most significant bit of said number; a plurality of bit selectors each responsive to one of said group select signals and the sum bits of the corresponding group for producing bit select signals corresponding to the most significant bit of the selected group; translator means responsive to said group select and bit select signals for producing a left shift count; a third register; a right circular shift means responsive to said first register for entering the sign and mantissa of said number into third register in shifted position; means responsive to said left shift count for producing a right shift count, said right shift count being applied to said right circular shift means; and characteristic means responsive to the absence of said group A select signal and the sign of said number for entering said left shift count into said third register as the characteristic.

17. A normalizer device as claimed in claim 16 wherein said characteristic means includes means for entering the complement of said left shift count into said third register when the sign of said number is positive.

18. A normalizer device as claimed in claim 16 wherein said characteristic means includes means responsive to a group A select signal and the sign of said number for entering said right shift count into said third register as the characteristic.

19. A normalizer device as claimed in claim 18 wherein said characteristic means includes means responsive to a group A select signal for entering the complement of said right shift count into said third register when the sign of said number is positive.

20. A normalizer device as claimed in claim 16 wherein said right circular shift means comprises means for right circular shifting said number up to 2 N bit positions, said means for producing a right shift count comprising means responsive to the absence of said group A select signal for substracting said left shift count from 2N to form said right shift count and means responsive to said group A select signal for forming a right shift count equal to the number of bits grouped in group A minus said left shift count.

No references cited.

ROBERT C. BAILEY, *Primary Examiner.*

M. A. LERNER, *Assistant Examiner.*